Figure 1:
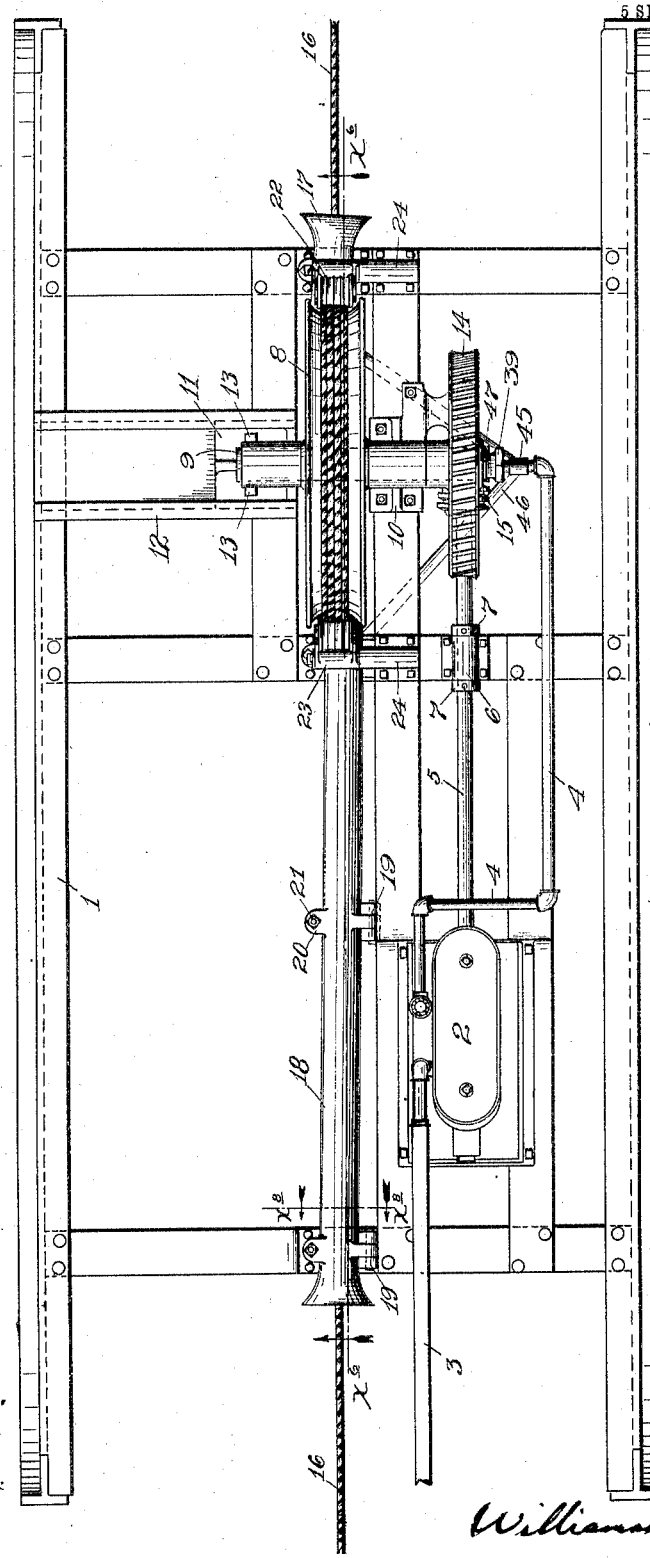

No. 775,900. PATENTED NOV. 22, 1904.
H. B. FREY.
DRAFT MECHANISM FOR LOGGING SLEDS.
APPLICATION FILED MAR. 22, 1904.
NO MODEL. 5 SHEETS—SHEET 1.

Witnesses.
N. S. Kilgore
E. W. Jeppesen

Inventor:
Henry B. Frey
By his Attorneys
Williamson & Merchant

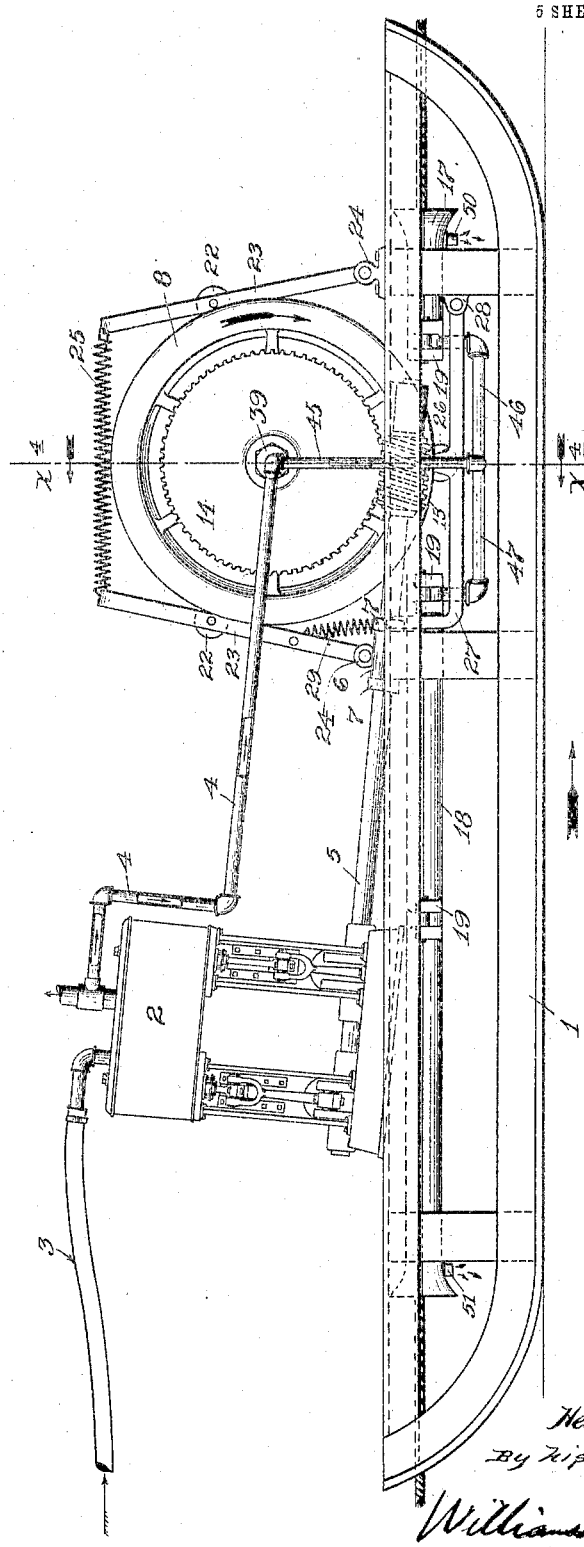

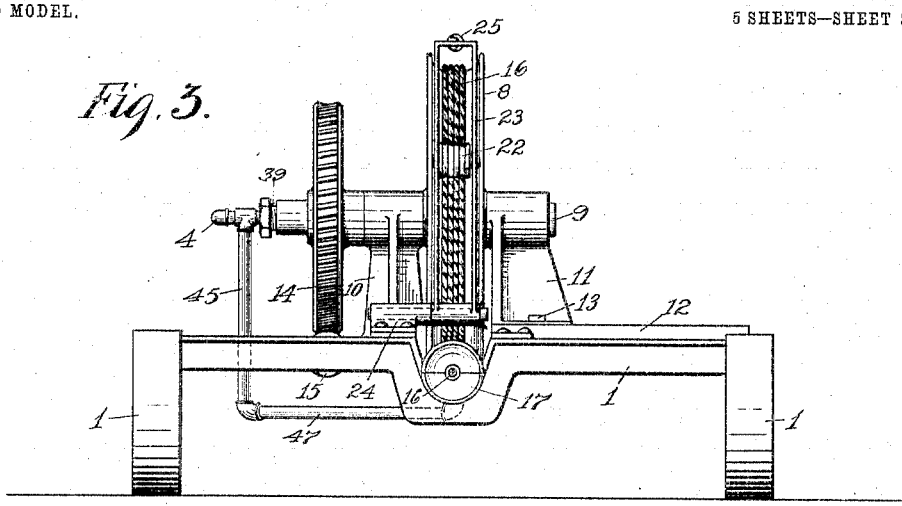
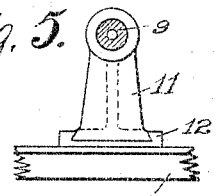
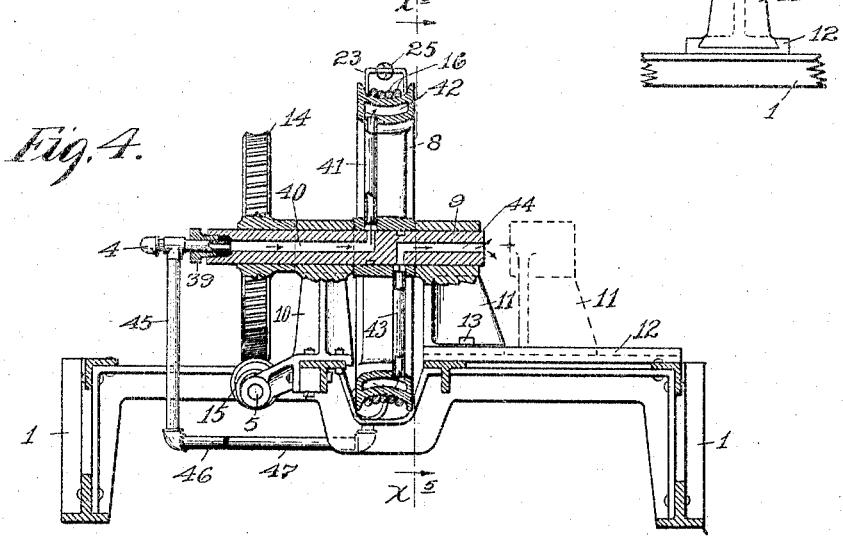

No. 775,900. PATENTED NOV. 22, 1904.
H. B. FREY.
DRAFT MECHANISM FOR LOGGING SLEDS.
APPLICATION FILED MAR. 22, 1904.
NO MODEL. 5 SHEETS—SHEET 4.

Witnesses.
H. A. Kilgore
E. W. Jeppesen

Inventor,
Henry B. Frey.
By his Attorneys,
Williamson & Merchant

No. 775,900. PATENTED NOV. 22, 1904.
H. B. FREY.
DRAFT MECHANISM FOR LOGGING SLEDS.
APPLICATION FILED MAR. 22, 1904.
NO MODEL. 5 SHEETS—SHEET 5.
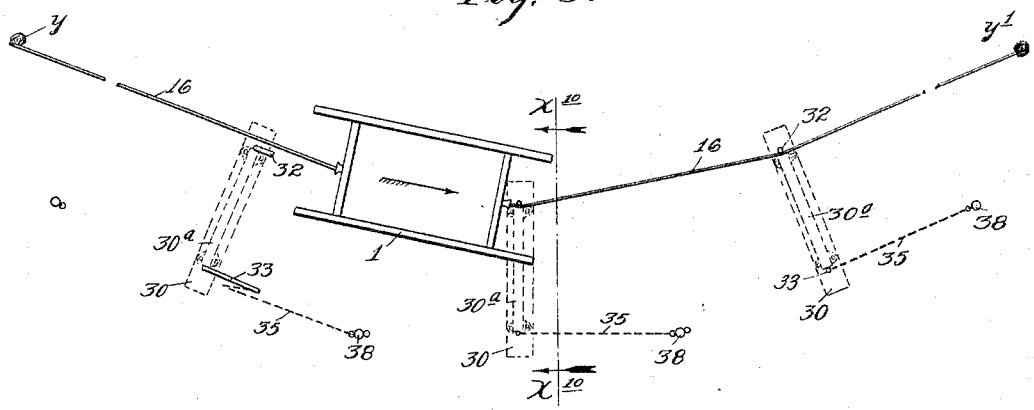
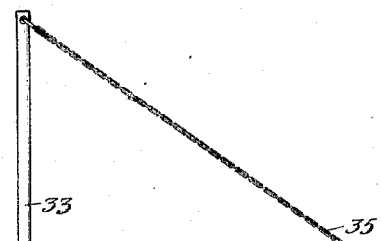
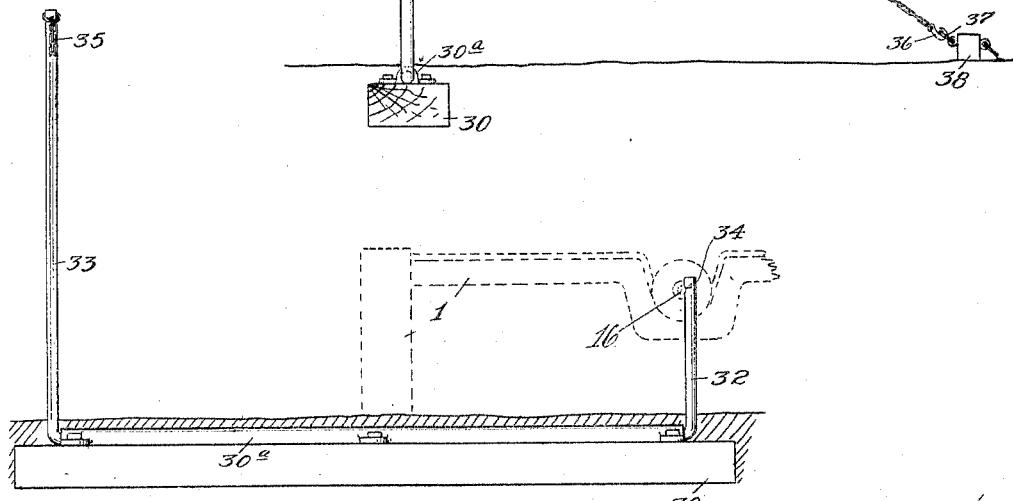
Witnesses.
J. D. Kilgore
E. W. Jeppesen
Inventor.
Henry B. Frey.
By his Attorneys.
Williamson Merchant No. 775,900. Patented November 22, 1904.

UNITED STATES PATENT OFFICE.

HENRY B. FREY, OF MINNEAPOLIS, MINNESOTA.

DRAFT MECHANISM FOR LOGGING-SLEDS.

SPECIFICATION forming part of Letters Patent No. 775,900, dated November 22, 1904.

Application filed March 22, 1904. Serial No. 199,510. (No model.)

*To all whom it may concern:*

Be it known that I, HENRY B. FREY, a citizen of the United States, residing at Minneapolis, in the county of Hennepin and State of Minnesota, have invented certain new and useful Improvements in Draft Mechanism for Logging-Sleds; and I do hereby declare the following to be a full, clear, and exact description of the invention, such as will enable others skilled in the art to which it appertains to make and use the same.

My invention has for its special object to provide improved draft mechanism for logging-sleds, but is capable of more general use for drawing sleds or trucks by the use of a traction-cable. To the above ends the invention consists of the novel devices and combinations of devices hereinafter described, and defined in the claims.

In accordance with my invention the sled or truck is provided with a power-driven traction drum or windlass, and a long cable is provided, the said cable being run over the said traction drum or windlass. This cable is attached at one end at a distant point in front of the sled or truck and at its other end at a distant point in the rear of the said sled or truck. Under one direction of movement of the traction drum or windlass the sled is positively drawn in one direction, and under a reverse direction of movement of the said traction drum or reel the said sled is positively drawn in the opposite direction.

To support or hold the cable against lateral movements at points along the line of travel when the sled or truck must turn a curve or move on a circular course, so-called "trip-stakes" are provided. Provision is also made for utilizing the exhaust from the impelling-engine to thaw ice and snow from the cable and from the traction drum or reel.

The above and other novel features of construction will appear in the following detailed description of the mechanism illustrated in the drawings.

In the accompanying drawings, which illustrate my invention, like characters indicate like parts throughout the several views.

Figures 6, 7, 8:
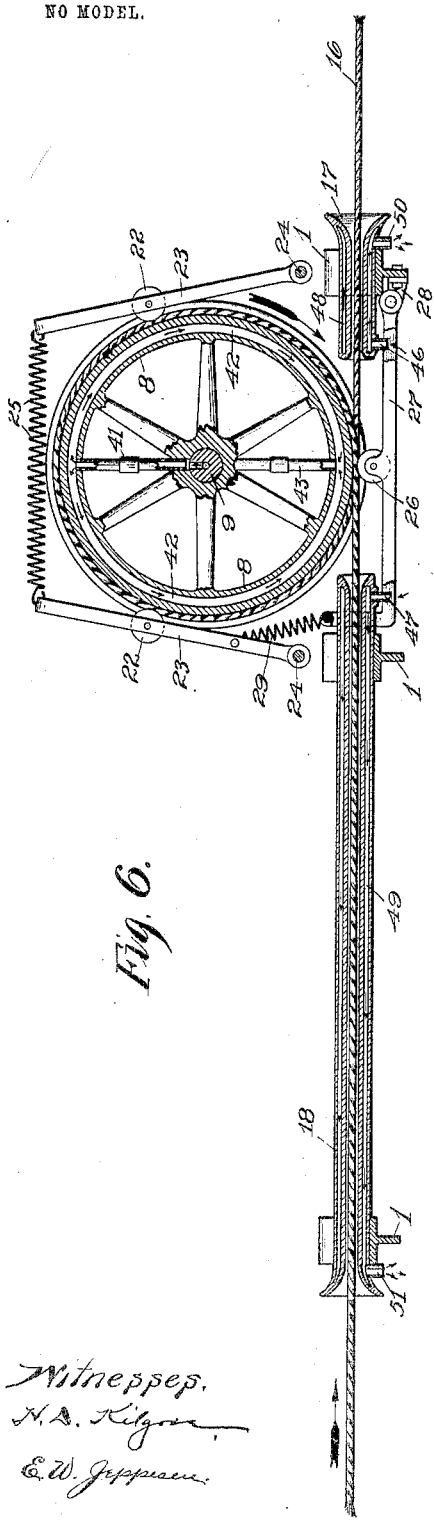

Figure 1 is a plan view of the sled and parts carried thereby. Fig. 2 is a side elevation of the parts shown in Fig. 1. Fig. 3 is a front elevation of the parts shown in Figs. 1 and 2. Fig. 4 is a transverse vertical section on the line $x^4$ $x^4$ of Fig. 2. Fig. 5 is a detail in section on the line $x^5$ $x^5$ of Fig. 4, some parts being broken away. Fig. 6 is a vertical longitudinal section on the line $x^6$ $x^6$ of Fig. 1. Fig. 7 is a plan view showing in detail the cable-guiding tubes opened upon their hinges. Fig. 8 is a detail in section on the line $x^8$ $x^8$ of Fig. 1. Fig. 9 is a diagrammatic plan view illustrating the manner in which the traction-cable is held at a curve by the so-called "trip-stakes." Fig. 10 is a transverse section on the line $x^{10}$ $x^{10}$ of Fig. 9, and Fig. 11 is a side elevation of one of the trip-stakes and connections thereto.

The numeral 1 indicates a heavy sled which serves as a support for the driving mechanism. The numeral 2 indicates an engine which is carried by said sled. The said engine is shown as being a two-cylinder upright steam-engine. In the illustration given in the drawings this engine is to be supplied with steam from a boiler (not shown) which would be carried by a tender or supplemental sled hitched to the sled 1. This tender-sled will be hitched to one end of the main sled 1 and need not be shifted from one end to the other thereof for reverse directions of travel. The train of log-carrying sleds under one direction of travel should be hitched to the tender and under the other direction of travel to the main sled. The live steam would be conveyed from the boiler to the steam-chest of the engine 2 by a hose 3.

The numeral 4 indicates an exhaust-pipe leading from the engine and directing the steam to points hereinafter noted.

The numeral 5 indicates the power-driven crank-shaft of the engine, which shaft has the usual engine-mountings and is further journaled in a bearing 6 on one of the transverse beams of the sled 1 and is provided with thrust-collars 7, which engage the opposite sides of the bearing 6, as best shown in Fig. 1.

The numeral 8 indicates a large traction-drum, the shaft 9 of which is mounted in heavy bearings 10 and 11, the former of which is rigidly secured to the frame of the sled 1 and the latter of which is mounted to slide transversely of the sled in a guide 12, secured to the framework of the sled. (See particularly Figs. 1, 4, and 5.) Set-screws 13 serve to hold the bearings 11 in operative position.

The shaft 9 is of course rigidly secured to rotate with the drum 8. At one projecting end said shaft 9 is provided with a large worm-gear 14, that meshes with the worm or screw 15, carried by the engine-driven crank-shaft 5.

The traction-cable 16 is given several wraps about or around the traction-drum 8, and its ends are extended tangentially from the rear portion of said drum, the one end forward through a guide-tube 17 and the other rearward through a guide-tube 18. Directions forward and rearward, as above expressed, assume the sled to be traveling in the direction indicated by the arrows marked on Figs. 1, 2, 6, and 9. The guide-tubes 17 and 18 are split or formed by semitubular upper and lower sections connected by hinges 19 at one side and having at their other sides perforated lugs 20, through which short nutted bolts 21 may be passed to lock the sections together in operative positions. The lower sections of the said guide-tubes 17 and 18 are rigidly secured to the framework of the sled 1. The purpose of splitting these guide-tubes is to permit the cable to be placed therein by lateral movement. This feature is very important, since a very long cable will be employed, and it would be very inconvenient to thread the cable endwise through the said tubes. It may be here also stated that the shaft-bearing 11 is adapted to be adjusted or moved into the position indicated by dotted lines in Fig. 4, so that the cable may be placed on the drum 8 by lateral movement. This feature also has its obvious importance.

The cable wrapped on the drum 8 is tightly pressed against the same at the front and rear by presser-rollers 22, carried by levers 23, which levers, as shown, are bifurcated, are pivoted at their lower ends to bearings 24 on the sled-frame, and are yieldingly connected at their upper ends by a coiled tension-spring 25. Also the cable is preferably pressed against the bottom of the drum 8 by a presser-wheel 26, carried by a lever 27, pivoted to a bearing 28 on the sled-frame. The free end of this lever 27, as shown, is yieldingly drawn upward by a coiled tension-spring 29, attached to one of the levers 23. These presser-rollers serve to maintain the proper driving friction between the cable and the drum without requiring that end of the cable paid out to be drawn taut.

As shown in the diagram view, Fig. 9, the ends of the cable are anchored at $y$ and $y'$. These points $y$ and $y'$ will in practice be a long distance apart, and the ends of the cable may be thus anchored by any suitable means—as, for instance, by driven posts, tree-stumps, &c.

At places where there is a curve in the road-bed or sled-track ties 30 are embedded in the road-bed and rigidly anchored. To each of these ties is pivoted, by means of a cover-plate $30^a$, a bail-like trip-rod, which is turned up at one end to form a trip-stake 32 and at its other end to form a retaining-arm 33 and having its body embedded in the cover-plate $30^a$. The upper end of the trip-stake 32 projects vertically upward at the center of the track or runway and terminates in position to be engaged by the outer end of the guide-tube 17 or 18, according to the direction of movement of the sled. The upper end of the trip-stake 32 is preferably formed with a notch 34, which is adapted to hold upward the tautly-drawn portion of the cable. A chain or flexible connection 35 is connected to the upper end of each arm 33 and is adapted to be secured at its free end by a hook 36 or other device to a ring or eye 37, shown as secured to a post 38, set into the road-bed. The chains 35 should be extended in the direction in which the sled is to move over the cable.

As shown in Figs. 9 and 11, the sled is moving toward the right, and hence the chains 35 are extended toward the right. Under reverse movements of the sled the chains 35 should be extended toward the left, but attached in the same way as when extended toward the right. The chains 35 hold the trip-stakes 32 in such positions that the strain on the cable will tend to hold the chains taut, and thus the chains prevent the trip-stakes from being accidentally thrown down.

To keep the cable-guiding tubes 17 and 18 and the periphery of the traction-drum 8 warm or hot, the exhaust from the engine is run through suitable steam passages or jackets formed in the said parts. These steam-passages and the connections thereto and therefrom, as shown, are as follows: The exhaust-pipe 4 from the engine extends through a stuffing-box 39 in one end of the drum-shaft 9 into a steam-passage 40, formed in said shaft. From the passage 40 the steam passes through a radial pipe-section 41 into an annular steam-passage 42, formed in the peripheral portion of the drum 8. From the passage 42 the steam passes through a radial pipe 43 into a passage 44, formed in the shaft 9, and from thence it exhausts to the atmosphere.

Just outward of the stuffing-box 39 the exhaust-pipe 4 is provided with depending section 45, which communicate with branches 46 and 47. The branch exhaust-pipe 46 opens into steam jackets or cavities 48, formed in the sections of the guide-tube 17, while the branch pipe 47 opens into steam jackets or cavities 49, formed in the sections of the guide-tube 18.

The numerals 50 and 51, respectively, indicate exhaust-ports from the steam-jackets 48 and 49.

As shown in Fig. 7, the steam-jackets 48 and 49 are formed part in each section of the respective tubes and are arranged to be closed when and only when the sections of the said tubes are clamped together.

As is evident, by thus directing the steam around the said guide-tubes and traction-drum ice and snow will be kept melted from the said parts and from that portion of the cable which is wound around the drum. This prevents the tubes from being packed or clogged with snow and insures the greatest possible frictional engagement between the cable and the traction-drum.

As is evident, when the traction-drum is rotated in the direction of the large arrows marked thereon in Figs. 2 and 6 the sled will be caused to travel from the left toward the right with respect to Figs. 1, 2, 6, and 9. Under this direction of movement the entire pulling strain will of course be put upon that portion of the cable which is at the right— that is, which is ahead of the sled—while that portion of the cable which extends toward the left or toward the rear of the sled will be paid out and will be more or less slack.

When the sled reaches the curve, the forward end of the forwardly-projecting guide-tube which under the direction of movement indicated is the guide-tube 17 strikes in succession against the upper ends of the trip-stakes 32, and thus knocks them down one after the other. The said stakes, however, are not thus knocked down until after they have performed their function of holding the cable and causing the sled to travel the curve to the respective points where they are located.

The trip-stakes must of course be set up again before the sled makes its return trip, and for this return trip the chains 35 must, as already stated, be extended in a reverse direction from that indicated in the drawings.

With the cable anchored at both ends it is evident that not only may the sled be positively drawn forward either on a level or up a steep grade, but the rearwardly-extended portion of the cable will serve to prevent the sled and the train hitched thereto from running away in going downgrade.

The traction draft mechanism above described while especially adapted for hauling log-trains made up of sleds over snow or ice roads or runways is nevertheless well adapted for use to draw wheeled vehicles or trucks for various purposes. Hence it will be understood that in the claims of this application a sled and truck are treated as the equivalents the one of the other. It will also be understood that the mechanism described is capable of many modifications within the scope of my invention as herein set forth and claimed.

What I claim, and desire to secure by Letters Patent of the United States, is as follows:

1. In a device of the character described, the combination with a sled and a power-driven traction-drum carried thereby, of a traction-cable extending along the line of travel and running around said traction-drum, and one or more presser-rollers pressing against said cable into contact with said drum, substantially as described.

2. The combination with a sled of a power-driven traction-drum mounted thereon in bearings located on opposite sides of said drum, one of said bearings being movable laterally to and from working position, of an anchored traction-cable wrapped about said drum, substantially as described.

3. The combination with a sled and a power-driven traction-drum mounted thereon, of one or more split cable-guiding sleeves carried by said sled, and an anchored cable wrapped about said drum and working through said split guiding sleeve or sleeves, substantially as described.

4. The combination with a sled and a power-driven traction-drum mounted thereon, said drum having a steam-chamber following its peripheral surface, means for delivering steam through said steam-chamber to keep the periphery of said drum warm, and a cable wrapped about said drum, substantially as described.

5. The combination with a sled and a power-driven traction-drum mounted thereon, of one or more steam-jacketed cable-guiding tubes, and a traction-cable wrapped around said drum and passed through said guide sleeve or sleeves, substantially as described.

6. The combination with a sled and a steam-jacketed traction-drum mounted thereon, of steam-jacketed cable-guiding tubes located in the front and at the rear of said drum, means for supplying steam to the jackets of said drum and of said guide-tubes, and a traction-cable passed through said guide-sleeves and wrapped around said drum, substantially as described.

7. The combination with a sled, of a traction-drum mounted thereon and having a steam-jacketed periphery, of a steam-engine mounted on said sled and having connections for driving said drum, and having an exhaust-pipe leading to the peripheral jacket of said drum, and a traction-cable wrapped around said drum, substantially as described.

In testimony whereof I affix my signature in presence of two witnesses.

HENRY B. FREY.

Witnesses:
ROBERT C. MABEY,
F. D. MERCHANT.